United States Patent [19]
Damen et al.

[11] 3,863,177
[45] Jan. 28, 1975

[54] METALLIC PENTAPHOSPHATE GLASSES AND USES THEREFOR

[75] Inventors: Theodore Charlouis Damen, Colts Neck; Bruce Cedric Tofield, Bradley Beach; Heinz Paul Weber, Middletown, all of N.J.

[73] Assignee: Bell Telephone Laboratories, Incorporated, Murray Hill, N.J.

[22] Filed: May 9, 1973

[21] Appl. No.: 358,657

[52] U.S. Cl. ........... 331/94.5 F, 252/301.4, 330/4.3
[51] Int. Cl. .............................................. H01s 3/16
[58] Field of Search ................ 331/94.5; 252/301.4; 330/4.3

[56] References Cited
UNITED STATES PATENTS
3,813,613   5/1974   Danielmeyer et al. .......... 331/94.5 F OTHER PUBLICATIONS
Danielmeyer et al., Fluorescence in Neodynium Ultraphosphate, IEEE J. Quant. Elect., Vol. QE-8, No. 10, (October 1972), pp. 805–808.

*Primary Examiner*—William L. Sikes
*Attorney, Agent, or Firm*—Wilford L. Wisner

[57] ABSTRACT

There are disclosed various embodiments of a laser in which the dielectric active medium is a rare earth pentaphosphate glass, for example, neodymium pentaphosphate glass. These glasses are particularly advantageous when used in various active optical devices such as in the integrated optical circuit art. Methods for making the pentaphosphate glass are also disclosed. The glass typically has a slightly shorter lifetimes and broader linewidths than the crystals, but can be made more easily with the desired size and optical quality than can the crystals. Making the glass involves melting the crystalline material in a sealed nonreactive container and then cooling the melted material in the sealed container until completely solidified.

11 Claims, 11 Drawing Figures

Patented Jan. 28, 1975

Patented Jan. 28, 1975    3,863,177

Patented Jan. 28, 1975

METALLIC PENTAPHOSPHATE GLASSES AND USES THEREFOR

BACKGROUND OF THE INVENTION

This invention relates to optically-pumped solid state lasers and to other optical devices employing dielectric media.

Prior art dielectric crystal lasers have typically employed active ions such as neodymium that are introduced into a host material as doping impurities. stringent limits must then be observed on the concentrations of the ions if sufficient light emission is to be obtained. For example, in a Nd:YAG laser crystal, the neodymium concentration should be limited to about 1.4 $\times$ $10^{20}$ per cubic centimeter, which concentration corresponds to a one percent replacement of the yttrium in $Y_3Al_5O_{12}$. Higher concentrations lead to fluorescence quenching through exchange interactions between neodymium ions, which shortens the fluorescence lifetime. The exchange interactions and another phenomenon called cross-relaxation quenching cause the fluorescent efficiency of the material to decrease so that any advantage of higher doping concentrations is nullified. Similarly, ions desirable for excitation transfer to an active ion, such as $Cr^{3+}$, which transfers energy to $Nd^{3+}$ in YAG, are limited to about $5 \times 10^{19}$ per cubic centimeter. Higher concentrations decrease the heat conductivity of the host crystal. The decrease in heat conductivity leads to an increase of the crystal temperature during optical pumping and a decrease of fluorescent efficiency results. Unfortunately, $Cr^{3+}$ apparently must be within 10 Angstrom units separation from $Nd^{3+}$ to transfer energy efficiently thereto. Such a spacing would appear to be achievable only at high ionic concentrations.

In the copending patent application of H. G. Danielmeyer et al. Ser. No. 347,189 filed Apr. 2, 1972, now U.S. Pat. No. 3,813,613, and assigned to the assignee hereof, we rejected the concept of a doped crystal and provided a chemical complex having a large unit cell in which the neodymium ions were integral constituents of the compound instead of statistically distributed impurities.

While this advance tends to make the neodymium ion lasers more compatible with the integrated circuit art, still further versatility in the fabrication of devices with varying capabilities as active elements in such circuits is desirable.

SUMMARY OF THE INVENTION

Our invention is based on our discovery of a way to make readily reproducible glassy elements incorporating the rare earth pentaphosphates of varying compositions.

According to one feature of our invention the crystalline material is melted in a sealed nonreactive tube or container, for example, a sealed platinum container, and then is cooled to achieve complete solidification in the sealed container.

The easier fabrication of the glasses, as compared to large single crystals, and the relatively broader linewidths of the glasses make them especially suited to use in transversely-pumped lasers, tunable pulsed lasers and a wide variety of integrated optical circuits.

Other features of our invention preside in the particular configurations of a transversely-pumped laser using the rare earth pentaphosphate active elements and in techniques for finishing the end surfaces of the transversely-pumped laser elements.

According to a more specific feature of our invention as related to the transversely-pumped lasers and also to other active optical devices in which extended optical path length is desired, the glassy element is embedded in a dielectric material of like hardness. The embedding material is typically transparent. The end surfaces of the glassy pentaphosphate are polished along with the surrounding dielectric material, thereby avoiding edge damage in the polishing process to the metallic pentaphosphate glass element. Advantageously, this method of active element preparation is also applicable to single crystals of the rare earth pentaphosphates of the type disclosed in the above-cited copending patent application. In addition, with respect to the single crystal elements, various other techniques preparing the end surfaces are feasible. Among them are cleaving the end surfaces and holding the crystal to be polished in a jig of glass plates held to the crystal by application of pressure and polishing the end surfaces of the entire assembly.

According to another specific feature of our invention, the transversely-pumped lasers employ pumping means comprising semiconductor injection lasers or light-emitting diodes. Either pumping means is typically made of gallium arsenide p-n junctions or gallium aluminum arsenide heterostructure junctions.

BRIEF DESCRIPTION OF THE DRAWING

Further features and advantages of our invention will become apparent from the following detailed description, together with the drawing in which.

DESCRIPTION OF ILLUSTRATIVE EXAMPLES

Preparation of Crystals Glass Precursor

Typically 2.5 grams of neodymium sesquioxide ($Nd_2O_3$) 99.999 percent pure is added to 100 millilitres of phosphoric acid ($H_3PO_4$). The mixture is heated in a gold crucible over a flame until effervescence is completed and the solution is complete. A platinum crucible is less useful than a gold crucible for this step, as it is attacked to a certain extent by the phosphoric acid.

Then the crucible is covered with a platinum sheet and placed in an oven at a temperature which may be between 400° and 800° centigrade. Good crystals are obtained, for example, at 600°C. At this temperature evaporation is allowed to occur for 2–7 days and crystals ranging in size up to 2–3 millimeters are obtained. The shapes of the crystals vary somewhat with the temperature of the preparation. At the lower temperature, flat plates and more irregular chunks are formed; whereas, at about 700°C, long needles may be formed. The hot liquid is poured into 500 millimeters of distilled water which is filtered through a glass filter in a vacuum apparatus. To extract the crystals remaining in the gold crucible, distilled water is added; and this is boiled to achieve the loosening of the crystals from the crucible. The crystals are washed several times with hot water. Finally, they are washed with acetone and under suction to get the liquid off the crystals. After drying, they are easily poured into a suitable container for transfer to the glass-making apparatus, described below.

Preliminary analysis of the crystals before making the glass shows that most are single crystals and that their composition closely approximates the ideal pentaphosphate composition, $Nd\ P_5\ O_{14}$, in all cases. Measured compositions varied from the nominal compositions for each element by less than 1 percent for the phosphorus and less than 4 percent for the neodymium. Oxygen content was not analyzed because it is harder to detect and measure. Only very minor amounts of hydrogen were found in any of the samples.

Preparation of Glass

The container material is typically platinum tube of one quarter inch diameter and 10/1000 inches wall thickness. Typically, a length of tube of 1.5 inches is taken, one end pinched until closed and then welded with a spot welding machine. The crystals are inserted into the open end to almost fill the tube, and the other end of the tube is closed and sealed similarly. Thus, the first step of FIG. 1 is completed.

Figure 1A:
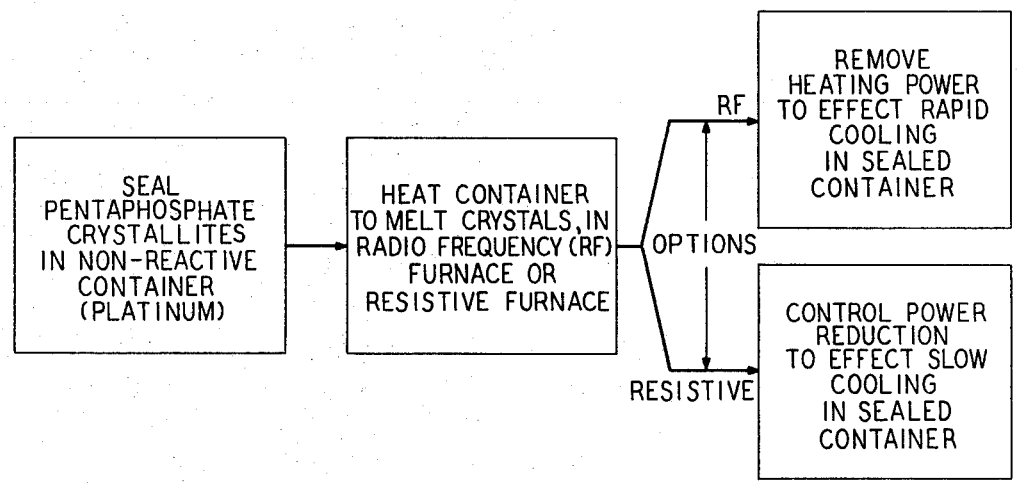
FIG. 1A is a flow diagram illustrating the method of making a glass according to our invention.
Figure 1B:
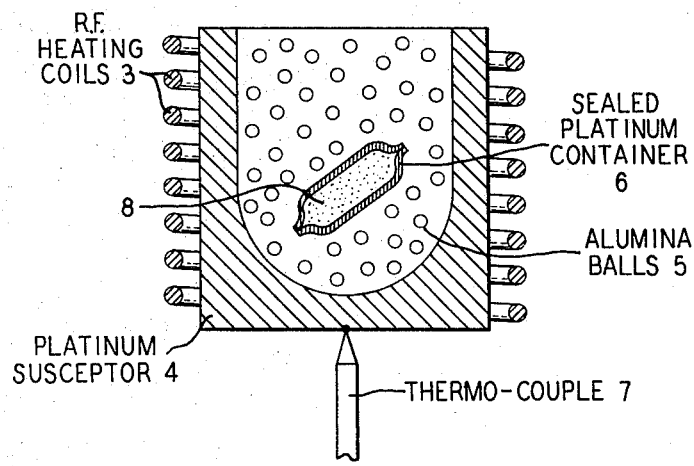
FIG. 1B shows a typical R.F. furnace in which the sealed container is placed to complete the process of FIG. 1A.

Each of two different modes have been used for heating the sealed container, as indicated in the second step of FIG. 1A. A radio frequency furnace, as shown in FIG. 1B, and a platinum wire resistive furnace are the apparatuses used for the two modes. In FIG. 1B, the sealed container 6 holds the crystals 8 that are to be melted.

During heating, it is essential that the pentaphosphate crystallites are sealed into a limited space during the preparation of the glass, as loss of phosphoric oxide as a vapor otherwise occurs, leading to decomposition into a metaphosphate (triphosphate) and further to an orthophosphate (a monophosphate). If the vapor is confined, so that its pressure increases with temperature, a pentaphosphate composition is essentially maintained.

In the R.F. mode, the sample is brought to the desired temperature in the R.F. furnace shown in FIG. 1B and is held at this temperature for typically one-half hour. The temperature is measured with a thermocouple 7 below a susceptor 4 that is made of platinum. The thermocouple 7 is conventionally disposed within the R.F. heating coil. An even temperature equilibrium within the sample is achieved by surrounding the sealed platinum tube 6 with alumina balls 5 within the susceptor 4. The thermocouple 7 will be at the same temperature as the sample 8, so long as proper conventional arrangement of the furnace avoids direct R.F. induction from the coils 3 into the sealed platinum tube 6.

Cooling is achieved by switching off the R.F. power and initial cooling rates of 200°C per minute are typically achieved. Glasses prepared by heating to just above the melting point in this fashion contain bubbles. Clear glasses are obtained by heating, however, to temperatures about 100°C or more above the melting point. The effect of temperature on optical properties is mentioned below.

In the resistance furnace, second option in FIG. 1A, the sample is typically heated to a temperature just above (about 20°C) the melting point. This temperature was maintained for 24 hours and slow cooling rates (30°C per hour) were used. In this way, the effect of annealing on the properties of the glass could be observed; and the bubbles observed in the R.F. mode process for lower heating temperatures are removed.

We have described the potential advantages of certain times and rates of heating and cooling. These times and rates may be varied widely from those specified in either mode. Finally, we established that the melting points of the rare earth pentaphosphate crystals in sealed platinum containers lie between 1,000°C and 1,100°C.

Incorporation of a transition metal, e.g., chromium, into pentaphosphate glass matrix may be effected to take advantage of the well-known technique of employing energy transfer from a transition metal such as chromium ($Cr^{3+}$) to pump the neodymium laser levels. It does not seem possible to incorporate the transition metal ions in the crystalline pentaphosphate form as they form metaphosphates, specifically, triphosphate crystals under the preparative conditions used. The melting point of chromium metaphosphate is reported to be 1,400°C. By a moderate increase in melting temperature, we have succeeded in incorporating small quantities of chromium metaphosphate glass homogeneously into the neodymium pentaphosphate glass by heating in the R.F. furnace.

For example, $Nd_{0.1}La_{0.9}P_5O_{14}$ with 5 mole percent $CrP_3O_9$ are mixed by hand for five minutes and the mixture sealed in the platinum container. Melting was achieved in the R.F. generator as described in FIG. 1, but to achieve complete solution of the chromium phosphate, the temperature must be about 200°C higher than the melting point of the rare earth pentaphosphate. The resulting glass is homogeneous and colored green. Neodymium fluorescence at 1.05 micrometers and at 0.9 micrometers of the well-known chromium R lines is observed from this crystal. Also broadband chromium fluorescence of a short (about 2 microseconds lifetime). Smaller quantities of chromium can be used in such a mixed glass. In such case the temperature elevation above that for the neodymium pentaphosphate is less than 200°C above the described above for FIG. 1; e.g., a temperature of about 1,100°C is used.

Various optical measurements on samples of our finished pentaphosphate glass show that they have no polarizing effect on light of any sort, in sharp contrast to the behavior of the crystals, and are completely isotropic in properties. Preliminary X-ray analysis also shows that they have no microcrystalline structure even on a small scale. It is expected that further such analysis will show that, nevertheless, the glasses, while all true glasses, have differing microscopic properties depending on the cooling rates. Rapid cooling should tend to produce a microscopic structure closely approximating that of the melt of step 2 of FIG. 1; whereas, slow cooling should produce a microscopic structure having the properties usually associated with annealing a glass to remove the stains.

The refractive index, $n$, increases with the Nd composition in the glass. Typical values (measured at 0.6328 $\mu$) are $Nd_{0.1}La_{0.9}P_5O_{14}$; = 1.554

$Nd_{0.5}La_{0.5}P_5O_{14}$; $n$ = 1.561

$NdP_5O_{14}$; $n$ = 1.565

These variations are sufficient that waveguiding may be expected, for example, in a thin film of $NdP_5O_{14}$ deposited on a $LaP_5O_{14}$ substrate. Numerous other waveguiding combinations are possible because of the variety of differing indices that are available.

Chemical analysis of the mixed glasses shows that their chemical composition closely approximates, as did the $NdP_5O_{14}$ glass above, both the ideal pentaphosphate composition $XP_5O_{14}$, where X is now a mixture of the trivalent rare earth ions, and also the compositions of the starting crystals for the major components thereof. Of course, in those cases in which a transition metal metaphosphate glass is mixed with rare earth pentaphosphate glass, the analysis of the final product shows approximately the expected proportions of all of the initial elements.

Laser Example I

Figure 2:
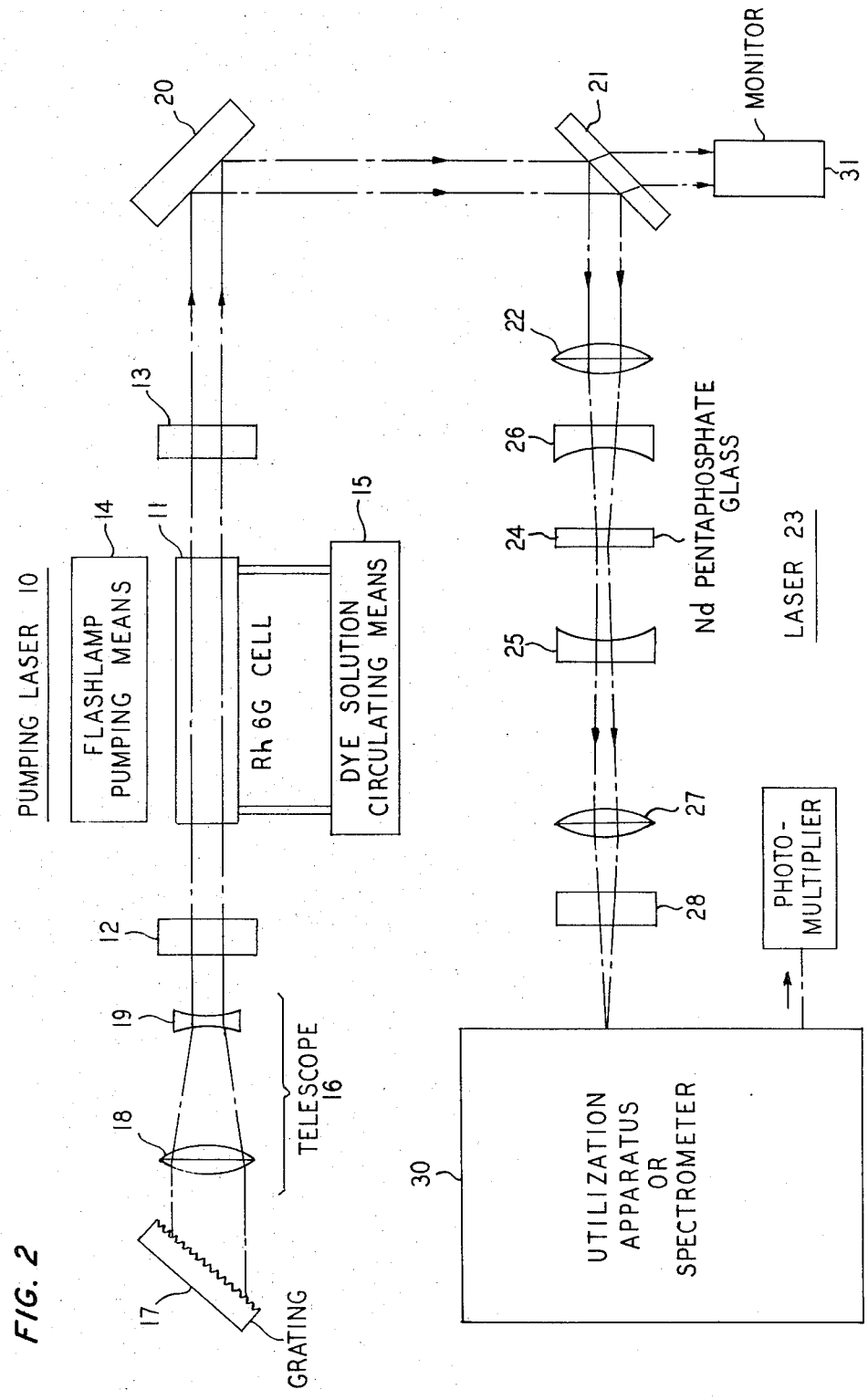
FIG. 2 is a partially pictorial and partially block diagrammatic illustration of a basic laser embodiment using our invention.

Our experimental setup is shown in FIG. 2. A flashlamp-pumped Rhodamine 6G dye laser 10 was employed to pump a glass element 24 of neodymium pentaphosphate which was included in a separate resonator including reflectors 25 and 26, the reflector 25 being partially transmissive to emit part of the neodymium laser radiation as an output to a utilization apparatus 30 or, as in our early experiments, to a spectrometer 30. The dye laser 10 included principal end reflectors 12 and 13 which had 3-meter concave radii of curvature (not shown) and transmissivities of 25 percent and 15 percent respectively. The dye laser 10 also included the beam-expanding telescope 16 and the wavelength-selective grating 17 beyond the 25 percent transmissive reflector 12. The power of telescope 16 was about 10 times.

The pumping dye laser pulses had a duration of about 0.5 microseconds, a center wavelength of about 0.58 micrometers and about 0.05 nanometers spectral bandwidth. A principal absorption band of our pentaphosphate glass containing a major constituent of neodymium is at about 0.58 micrometers. In a typical experiment, the pumping laser emission contained several transverse-order modes and had a peak power of about 400 watts, which corresponds to an energy of about 200 microJoules per pulse. The threshold energy for laser oscillation was 100 microJoules of pump light impinging on the laser glass.

The output pumping power transmitted through reflector 13 was redirected by oblique-incidence reflectors 20 and 21 through the lens 22 into the neodymium laser resonator. The neodymium pentaphosphate glass element 24 was a parallel-faced slab of approximately 1 millimeter thickness. The element 24 absorbed all the pump light and showed no sign of damage up to $10^8$ watts per square centimeter, the highest power density we could achieve. The surfaces of glass element 24 traversed by both the pumping laser beam and by the stimulated laser beam were optically flat and polished. The resonator of the laser 23 was a nearly concentric resonator with reflector 25 having a radius of curvature of 3.75 centimeters and a transmissivity of 1.5 percent at 1.05 micrometers and a transmissivity of 60 percent at 0.58 micrometers, the pumping wavelength. Typically, reflector 26 was identical to reflector 25 and was separated therefrom by a distance of 7.35 ± 0.05 centimeters.

For the fundamental mode of the nedoymium pentaphosphate glass laser 23, the calculated waist radius $w_o$ of the stimulated laser beam in the glass element 24 is in the range between 38 and 46 micrometers. The lens 22, with a focal length of 3.25 centimeters, focused the pump light onto an area slightly larger than this spot size. The output stimulated radiation from laser 23 was collected by a lens 27 and focused into a double grating spectrometer 30 from which the pump light had been blocked by a commercially available infrared-transmissive filter 28.

In an actual application of our invention, apparatus 30 would be a typical apparatus for using the laser radiation, for example, an integrated optical circuit such as would be useful in a data processing system or a telephone system.

Optical Properties of the Neodymium Pentaphosphate and Neodymium-Lanthanum Pentaphosphate Glasses Linewidths of the 1.05 microwave emission band have been measured for $NdP_5O_{14}$, $Nd_{0.5}La_{0.5}P_5O_{14}$ and $Nd_{0.1}La_{0.9}P_5O_{14}$ glass. There is very little variation with composition or thermal history and the average linewidth is 180 A. This may be contrasted with the linewidth of 10 percent Nd in silicate glass of 225 A.

Lifetimes for both $NdP_5O_{14}$ and $Nd_{0.1}La_{0.9}P_5O_{14}$ glass have been measured to be close to those of the respective crystals ($NdP_5O_{14}$ glass 85–90 $\mu$ $NdP_5O_{14}$ crystal 102 $\mu$ $Nd_{0.1}La_{0.9}P_5O_{14}$ crystal 280 $\mu$ $Nd_{0.1}La_{0.9}P_5O_{14}$ glass 250 $\mu$s).

The longest lifetimes, such as these, are found for rapidly cooled samples heated to only a few degrees (10°–20°C) above the melting point. The occurrence of bubbles in these samples may be removed by a longer period of heating. Slow annealing did not have a beneficial effect on the lifeline at $Nd_{0.1}La_{0.9}P_5O_{14}$ ($\tau$160 $\mu$s). Heating to higher temperature with rapid cooling also caused a reduction in lifetime ($\tau$=25 $\mu$s for $NdP_5O_{14}$ glass and $\tau$=170 $\mu$s for $Nd_{0.1}La_{0.9}P_5O_{14}$ glass). The lifetimes of $Nd_{0.5}La_{0.5}P_5O_{14}$ were intermediate to those given above.

Although $Nd_{0.1}La_{0.9}P_5O_{14}$ has only half the concentration of Nd ions per cc as the highest concentration Nd silicate glass ($\tau$=274 $\mu$s) (0.4 × $10^{21}$/cc of 1.0 × $10^{21}$/cc) it is clear that the pentaphosphate glasses which have narrower linewidths even at the highest Nd compositions show at least as much promise for laser application as the silicate glass.

For a glass element 24 of neodymium pentaphosphate laser action was achieved with about five times higher threshold than for the neodymium pentaphosphate crystal and with a bandwidth of about five nanometers. The laser oscillated only marginally above threshold when pumped by dye laser pulses which had a duration of about 0.5 microseconds, a center wavelength of 0.58 micrometers and 0.5 nanometers spectral bandwith and several transverse modes. The dye laser pulses had a peak power of about 400 watts which corresponds to a pumping energy of about 200 microJoules per pulse. As stated above, the one millimeter thick glass element 24 had an oscillation threshold of about 100 microJoules.

Chromium ($Cr^{3-}$) is known to be a useful ion for transferring energy to neodymium ions in some applications. The making of one chromium-containing glass was described above. It is submitted that the experiment with chromium established the feasibility of incorporating any transition metal ion in the mixed glass.

If one optically pumps the rare earth pentaphosphate material in one of its strong absorption bands to make a laser, the pumping light is absorbed in a very short travel distance into the material, about 100 micrometers. This makes it feasible that the axis for laser action extends just under the lateral surface parallel to the direction of elongation between the intended end surfaces. It encounters at the ends of the crystals very uneven, lossy surfaces because of the rounding of the edges that occurs during polishing.

Figure 3A:
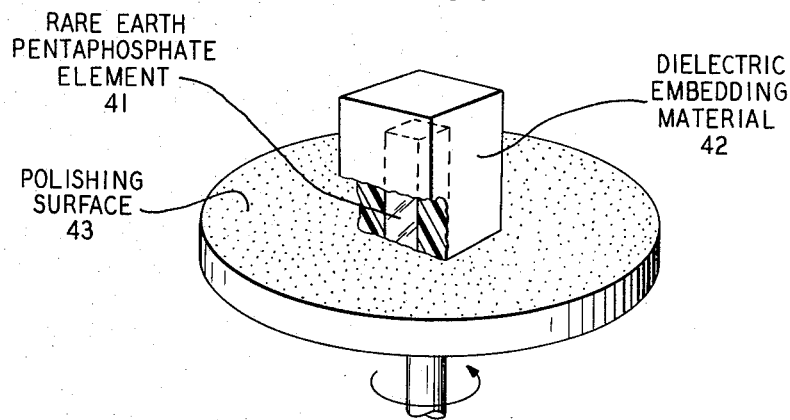
FIGS. 3A through 3C show different methods for finishing the end surfaces of a rare earth pentaphosphate active element for a transversely-pumped laser.

A cutting and polishing technique that overcomes this difficulty for the rare earth pentaphosphates is illustrated in FIG. 3A. The glassy or crystalline rare earth pentaphosphate element 41 is embedded in a dielectric embedding material 42 of like hardness. For neodymium pentaphosphate glass used as element 41, the embedding material 42 is typically a barium or flint glass. Suitable lateral and end surfaces are cut in material 42 spaced from the edges of the glassy element 41; and the ends of element 41 through which the laser radiation is to pass are polished on the polishing surface 43 driven by means not shown. Any edge rounding that occurs during the polishing on polishing surface 43 occurs at the edges of dielectric material 42 and not at the edges of element 41. The roughness and rounding of the edges typically occur because polishing medium or grit tends to pile up at the edges of the device being polished if polishing surface 43 rotates. The arrangement of FIG. 3A does not allow any material at the edges of element 41 since there is uniform contact between element 41 and embedding material 42. Therefore, only perfectly flat polished end surfaces can result for element 41.

After the polishing of the end surfaces is complete, as much of the lateral dielectric material as is desired is cut away, although much of it can also remain since it is selected to be nonabsorbtive to the pumping light at the illustrative wavelength of 0.58 micrometers.

Figure 3B:
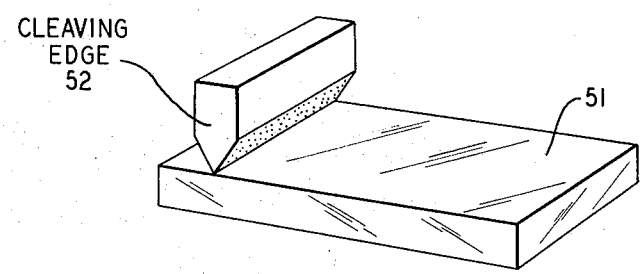

Still another way to make a crystalline or glassy body of suitable quality for a transversely pumped laser is shown in FIG. 3B. For purposes of discussion, it will be assumed that the body 51 is a single crystal of neodymium pentaphosphate. In order to provide high quality end surfaces for the transversely pumped laser, the crystal is cleaved along a cleavage plane.

Figure 3C:
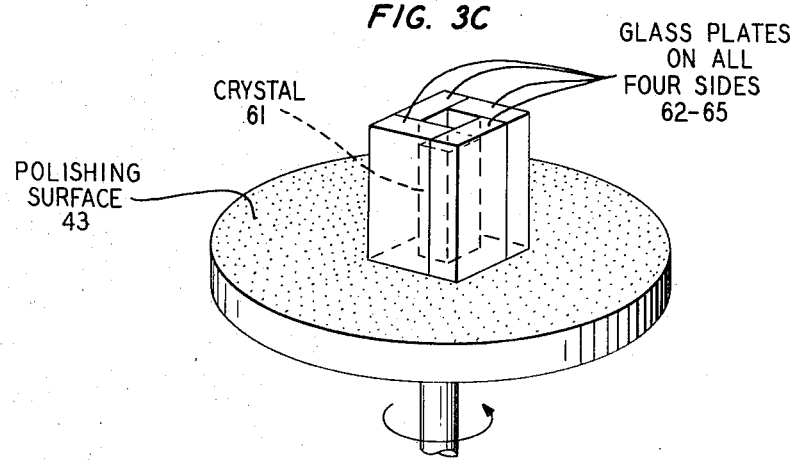

Still another way of achieving the adequate end surfaces of the transversely pumped laser is shown in FIG. 3C. Here the crystal 61 or glassy body 61 is placed between four glass plates 62 through 65 which are pressed in against the body on all four sides. These plates are then firmly held by clamps (not shown) in this position and the ends of the entire assembly are polished on the polishing surface 43. Because of the close fitting contact between crystal 61 and the glass plates 62–65, no substantial amount of polishing medium can build up between their edges at the end surface being polished. Therefore, nearly perfectly flat end surfaces are provided on crystal 61.

After the polishing process is complete, the clamps are removed and the glass plates are removed from crystal 61. The crystal 61 is ready for mounting in the laser.

We have further devised a specific way to pump a rare earth pentaphosphate laser transversely by a semiconductive light-emitting diode of known type.

Transverse pumping takes full advantage of the high concentration of neodymium ions in the new glassy neodymium pentaphosphate. Such a configuration also does not need pumping illumination as intense as an end-pumped laser. Hence, light-emitting diodes are desirable as the pumping means for such a laser.

Figure 4:
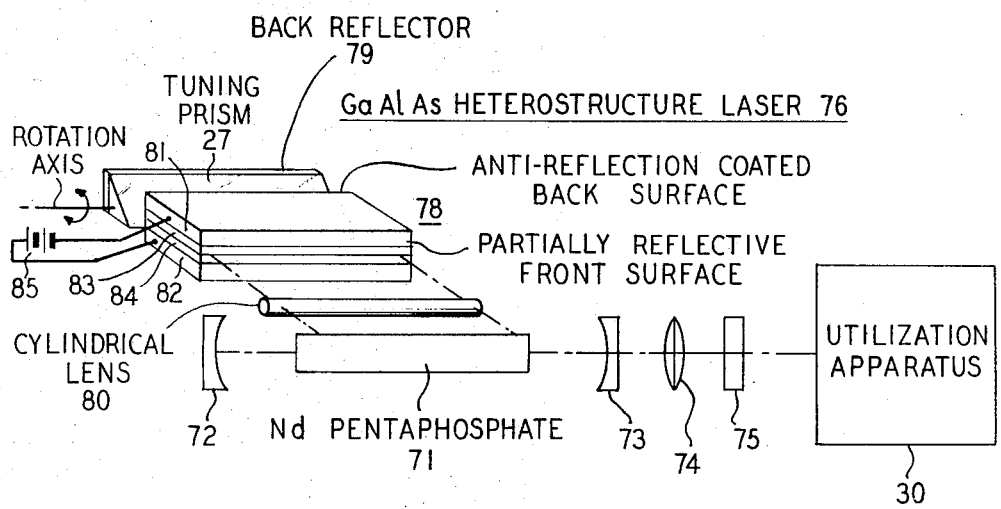
FIG. 4 is a partially pictorial and partially block diagrammatic illustration of a transversely-pumped laser according to our invention.

Such an embodiment is shown in FIG. 4. Here the neodymium pentaphosphate body 71, either a glass element or a crystal, is disposed between end reflectors 72 and 73, the latter being partially transmissive for the extraction of an output which is focused into the apparatus 30 by lens 74 through bandpass filter 75. The neodymium pentaphosphate body 71 is pumped by the gallium aluminum arsenide heterostructure laser 76 which includes a tuning prism 77 rotatable about an axis orthogonal to the direction of lateral transmission from the semiconductor heterostructure. The back surface of the prism 77 is covered by a totally-reflective reflector 79 of laser 76. The heterostructure body 78 includes the p-type region 81 of $Al_zGa_{1-z}As$ and the n-type region 82 of GaAs or $Al_yGa_{1-y}As$ and layers 83 and 84 therebetween. These layers are respectively the following: nearly intrinsic layers of GaAs of p and n-types, forming a homojunction. The mixed layers 81 and 82 may have their aluminum concentration and impurity dopings reduced in steps toward layers 83 and 84. Source 85 provides current flow from the n-layers toward the p-layers. Alternative constructions for such a laser diode are given in U.S. Pat. No. 3,691,476 of I. Hayashi, issued Sept. 12, 1972. The radiation from laser 76 propagates in body 78 primarily in the p-type region 83. The heterostructure 76 illustratively oscillate at about 0.8 micrometers, as is most desirable for transverse pumping; and this wavelength is readily absorbed by the neodymium pentaphosphate body 71. Oscillations occur in a beam having an extended transverse dimension parallel to the axis of the resonator, although a plurality of pumping diodes could be used instead. In order to make most efficient use of the pumping light, the coherent laser light emitted from laser 76 is focused by a cylindrical lens 80 to illuminate a region along the entire length of the element 71 between reflectors 72 and 73 along the common central normals to the reflective surfaces 72 and 73. Oscillations from the element 71 occur at about 1.05 micrometers.

Figure 6:
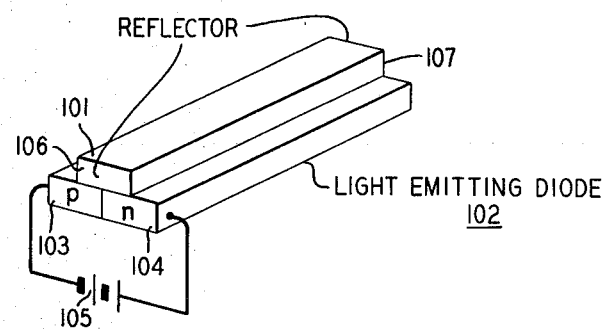
FIG. 6 is a pictorial illustration of another transversely-pumped embodiment of the invention in a compact integrated form.

Another transversely-pumped embodiment uses a light-emitting diode instead of a laser as a pump as shown in FIG. 6. In the integrated embodiment of FIG. 6, the neodymium pentaphosphate crystal 101, which could alternatively be a glass element, is disposed directly upon the emitting face of light-emitting diode 102. Illustratively, the pumping light from diode 102 is compelled to be emitted in a line parallel to the axis of pentaphosphate crystal 101. By silvering the surface of diode 102 opposit crystal 101, the pump emission occurs primarily toward crystal 101, avoiding pump laser action along the long dimension of the p-n junction formed between the p-type region 103 and the n-type region 104. In addition, the surface of element 101 opposite the junction may also be silvered. The excitation source 105 is connected between regions 103 and 104 in the forward-bias polarity.

To provide laser action in the pumped crystal 101, its end surfaces 106 and 107 are coated to be highly reflective at 1.05 micrometers, the wavelength of the neodymium ion emission. The laser action occurs virtually near the interface of the crystal 101 and the diode 102 along their length. In the typical case in which light-emitting diode 102 has a heterostructure very similar to that of diode laser 76 of FIG. 4, the 1.05 micrometer light will propagate primarily in the neodymium pentaphosphate material 101. As in the embodiment of FIG. 4, the diode 102 is adapted to emit primarily at 0.8 micrometers wavelength, since this wavelength is the most desirable for the transverse pumping.

Conversely, pumping radiation of 0.9 micrometers wavelength is most desirable for end-pumping of a neodymium pentaphosphate crystal or glass laser, as the pumping radiation is then absorbed over a longer propagation distance in the active material than is the 0.8 micrometer radiation. A further advantage of a glassy active medium of a rare earth pentaphosphate is that it is readily formed into an optically pumped waveguide glass laser.

Figure 5:
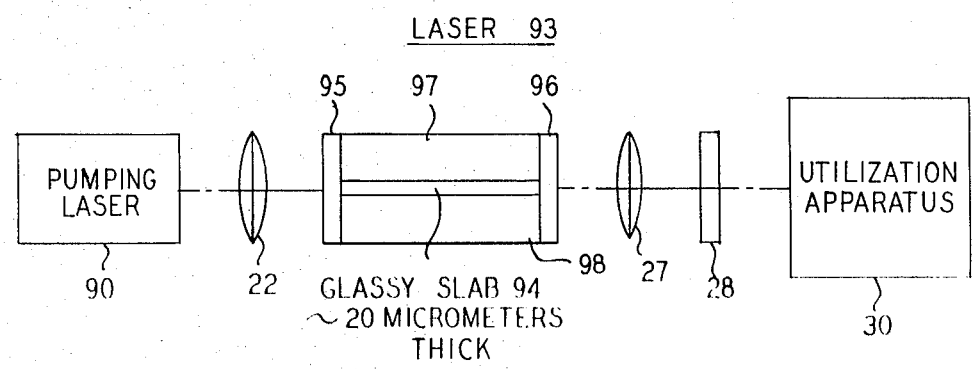
FIG. 5 is a partially pictorial and partially block diagrammatic illustration of a waveguide-type laser according to our invention.

Such an embodiment is shown in FIG. 5. Many of the components of FIG. 5 are the same as corresponding components in FIG. 1 and are similarly labeled. The pumping laser 90 is a modification of the laser diode 76 of FIG. 4 to produce laser action at 0.9 micrometers instead of at 0.8 micrometers by suitable known changes of the composition of the diode.

The neodymium pentaphosphate glass laser 93 includes the slab 94 of neodymium pentaphosphate glass, which is glued to quartz crystal 98, polished down to about 20 micrometers thickness, and the glued to the second quartz crystal 97. Reflective dielectric coatings 95 and 96 are thereafter applied to the end surface of the laser. Preferably, coating 95 is transparent at the 0.95 micrometer pump wavelength. This construction of the laser 93 makes it function as a waveguide for both the 0.9 micrometer and 1.05 micrometer radiation, as is appropriate for the longer absorption distance of the 0.9 micrometer pumping light in the neodymium pentaphosphate glass. The laser 93 itself oscillates at a wavelength of about 1.05 micrometers.

Another way to make the waveguide would be to metal-coat all lateral surfaces of slab 94, except the input and output surfaces, to retain the pump radiation because of the low absorption at 0.9 micrometers.

It should also be apparent that in the embodiment of FIG. 5 the pump can be a light-emitting diode similar to diode 102 of FIG. 6 instead of the laser 90. For the thicknesses of slab 94 contemplated the incoherent pumping light can still be focused into the end of the slab. Moreover, in FIG. 5 as in FIG. 4, the active width pentaphosphate element can be a single crystal instead of a glass, although single crystals of the appropriate length and widith are somewhat more difficult to fabricate. A total length between reflectors 95 and 96 of at least one or two millimeters is preferred.

Figure 7:
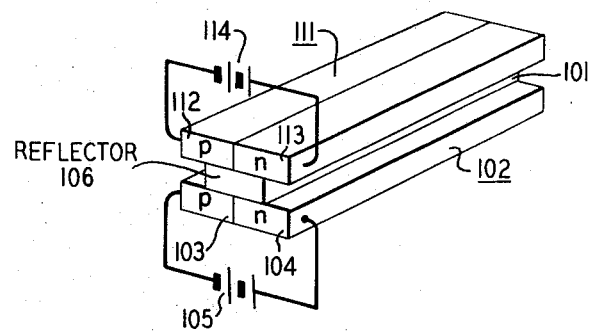
FIG. 7 is a pictorial illustration of a double-pumped laser similar to that of FIG. 6.

A variation of the integrated transversely-pumped embodiment of FIG. 6 is shown in FIG. 7. In FIG. 7, components like those of FIG. 6 are numbered the same and an additional diode 111 is added on the side of element 101 opposite to diode 102. The diode 111 is identical to diode 102 and is biased in like manner by an excitation source 114.

In the embodiment of FIG. 7 sufficiently intense pumping by the light-emitting diodes 102 and 111 will permit illumination of crystal 101 completely throughout the region between the junctions of the diodes, thereby permitting the laser action to be centered about a central axis through crystal 101. To this end also, a diluted crystal, for example, $Nd_{0.1}La_{0.9}P_5O_{14}$ crystal can be used in place of crystal 101; or a like glass element could be used.

Figure 8:
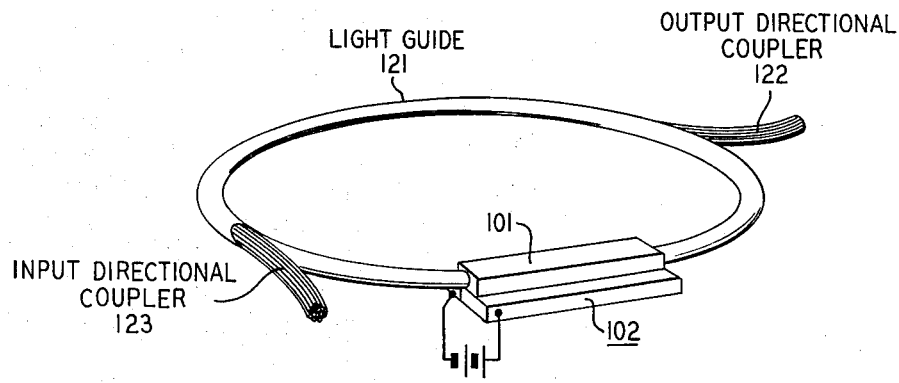
FIG. 8 shows a modification of the embodiment of FIG. 6 to make a ring laser.

The embodiment of FIG. 6 can be further modified to make a ring laser as shown in FIG. 8. In this case, reflectors 106 and 107 are not supplied at the ends of crystal 101, but are replaced instead by the polished ends of an optical light guide fiber 121 which is glued to the n surfaces of crystal 101 by an index-matching glue. The light guide fiber 121 is illustratively composed of high purity relatively water-free fused silicon of the type now well known in the art.

The losses for the laser action at 1.05 micrometers are now extremely small. The build-up of the light flux in the ring laser thus resolved can be used to advantage only if an output can be obtained. To this end an output directional coupler 122 is provided by attaching an additional section of fused quartz fiber with an oblique in-phase contacting the light guide fiber 121. The coupler now couples out a portion of the ring laser oscillation preferentially that propagates in the clockwise direction in the view of FIG. 8.

Similarly, if the pumping intensity level is reduced until oscillations no longer occur, the apparatus at FIG. 8 can now be used as an amplifier. To this end, an input directional coupler 123 like directional coupler 122 and adapted for input coupling of a clockwise propagating wave is attached at another point on fiber 121. Part of the light coupled in will propagate around the loop one or more times and become amplified by crystal 101 without producing oscillations.

It should also be noted that the devices of FIGS. 4 through 7 can also be used as amplifiers instead of oscillators by reducing the reflectivity of the end faces of the respective active elements.

It should also be clear that other active rare earth ion capable of laser oscillation or amplification could be used instead of neodymium. Such ions include praesodymium, erbium and holmium, for example.

We claim:

1. A transversely-pumped laser comprising an elongated active element including at least neodymium pentaphosphate, means for resonating 1.05 micrometer radiation from said element along an axis, and means for pumping said element transversely to said axis at wavelengths overlapping at least one absorption band of said element.

2. A laser according to claim 1 in which the pumping means comprises a heterostructure diode including gallium arsenide and gallium aluminum arsenide and means for promoting radiation emission of said diode at about 0.8 micrometers.

3. A laser according to claim 2 in which the heterostructure diode emits its radiation in a beam having an elongated transverse dimension extending parallel to the axis of the resonating means, the pumping means including means for cylindrically focusing said beam from said laser diode onto a surface of the elongated active element to illuminate a region thereof elongated parallel to said axis.

4. A laser according to claim 2 in which the means for promoting radiation emission of the diode at about 0.8 micrometers includes one partially reflective end surface for the emitting region of said diode, an opposed end reflector separated from the other end of the emitting region of said diode, and a wavelength selective device disposed between said diode and said opposed end reflector, whereby laser action is obtained at 0.8 micrometers.

5. A longitudinally-pumped laser comprising an elongated active element including at least neodymium pentaphosphate, at least one transparent element disposed in contact with said active element and giving structural strength to the combination thereof, means for resonating 1.05 micrometer radiation from said element along an axis in the direction of elongation, and means for pumping said element along said axis, comprising a source emitting in a band encompassing the weak absorption band of neodymium pentaphosphate near 0.9 micrometer and means for focusing said pumping radiation into said element for propagation along said axis.

6. A laser according to claim 5 in which the active element has one dimension of the order of 20 micrometers and the one transparent element has a lower index of refraction than said active element to provide guiding of the pumping radiation and the 1.05 micrometer radiation in said active element along said axis.

7. A laser according to claim 6 in which two transverse dimensions of the active element are substantially greater than 20 micrometers and including a second transparent element like the first transparent element, said first and second transparent elements being disposed in contact with opposite parallel major surface of the active element separated by said one dimension of the order of 20 micrometers.

8. A device adapted for the stimulated emission of coherent radiation comprising an elongated active element including at least one rare earth pentaphosphate, a light-emitting diode in contact with a lateral surface of said elongated element and having a junction extending the length of said elongated element, said diode including means for inhibiting laser action of said diode whereby incoherent emission of radiation at a wavelength corresponding to an absorption band of said elongated element is transmitted from said diode to said element, means for supplying an injection current to said diode to promote said incoherent emission of radiation, and means for stimulating from said elongated element the coherent emission of radiation at an emission wavelength of one rare earth ion included in said element.

9. A device according to claim 8 including a second diode like the aforesaid light-emitting diode and disposed on contact with a lateral surface of said elongated element opposite to the surface thereof contacted by the aforesaid diode.

10. A device according to claim 8 in which the means for stimulating the coherent emission radiation includes light guiding means coupling one end surface of said elongated element to the opposite end surface of said elongated element to make a ring, and the means for coupling an output from said guiding means.

11. A device according to claim 10 including means for coupling an input signal wave at the carrier wavelength of the emission of the active rare earth ion into said guiding means for amplification of a portion thereof by the elongated element, and means for injecting a current into the light-emitting diode at a level below that needed to sustain oscillations in the combination of the elongated element and the light guiding means.

* * * * *